Figure 1:
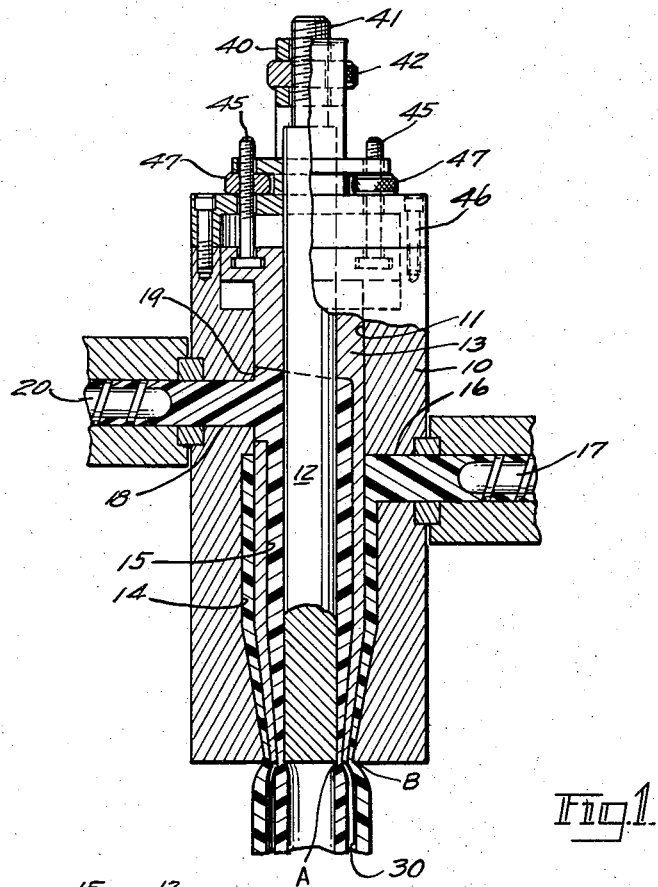

March 6, 1962

O. B. SHERMAN 3,023,461

METHOD FOR EXTRUDING PLASTIC MATERIALS

Filed Nov. 7, 1958

4 Sheets-Sheet 1

INVENTOR.
ORVILLE B. SHERMAN
BY
ATTORNEYS

March 6, 1962     O. B. SHERMAN     3,023,461
METHOD FOR EXTRUDING PLASTIC MATERIALS
Filed Nov. 7, 1958     4 Sheets-Sheet 3

INVENTOR.
ORVILLE B. SHERMAN
BY
ATTORNEYS

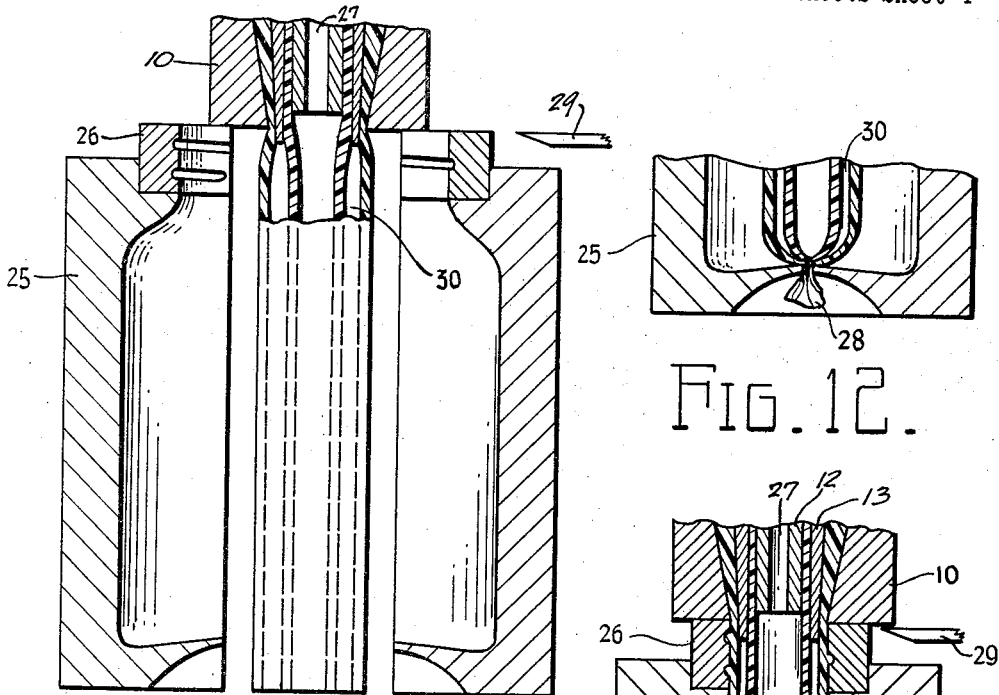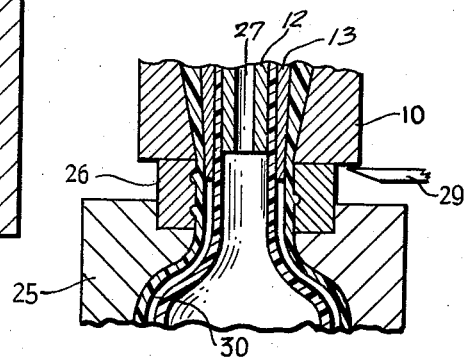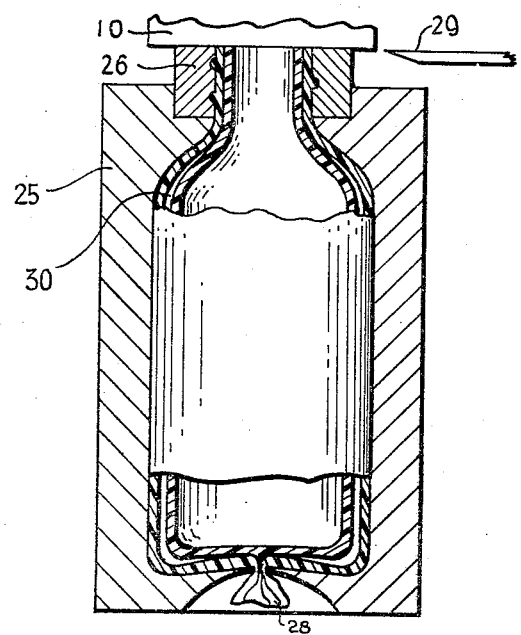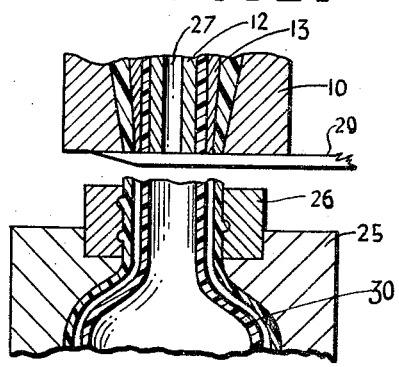

United States Patent Office 3,023,461
Patented Mar. 6, 1962

3,023,461
METHOD FOR EXTRUDING PLASTIC MATERIALS
Orville B. Sherman, West Orange, N.J., assignor to Owens-Illinois Glass Company, a corporation of Ohio
Filed Nov. 7, 1958, Ser. No. 773,135
4 Claims. (Cl. 18—55)

This present application is a continuation-in-part of my co-pending application, Serial Number 489,951, filed February 23, 1955, now abandoned.

This invention relates to the extrusion of plastic materials, and particularly to a method for simultaneously extruding concentric lengths of laminated tubing or spaced tubing.

It is an object of this invention to provide a method for simultaneously extruding concentric lengths of plastic material.

It is a further object of this invention to provide such a method wherein the concentric lengths of tubing may be either laminated or spaced from each other.

It is a further object of this invention to provide such a method wherein the concentric lengths of tubing may be changed from spaced to laminated or laminated to spaced during extrusion.

It is a further object of this invention to provide such a method wherein the extruded concentric lengths of tubing may be changed in thickness and diameter during extrusion.

It is a further object of this invention to provide such a method wherein the concentric lengths of tubing may be made of different plastic material.

Another object of the invention is to provide such a method wherein the concentric lengths of tubing may be at different temperatures.

After being extruded through an orifice, plastic materials undergo certain dimensional changes in the form of a swelling. The extent of these dimensional changes depends on a number of factors such as temperature, pressure, nature of the plastic material, shape of the orifice, and the like, but the changes are generally in the direction of increasing the cross-sectional area, provided no external longitudinal stretching occurs due to carry-off devices or due to the weight of the plastic material itself. For example, if a solid rod of plastic material is formed by extrusion through an orifice, the rod will have a larger diameter than the orifice through which it is extruded. When plastic material is extruded through an annular orifice, there is a tendency for the wall thickness of the extruded tube to be greater than the thickness of the annular orifice.

In addition to the general tendency to increase the cross-sectional area of extruded material, the edges of the orifice tend to have directive effects upon the extrusion, namely, to bend the issuing plastic material around the edge which is first reached by the material.

Basically this invention comprises a method which utilizes the inherent properties of plastic material, namely, to increase in cross-sectional area and to bend around the edge first reached during extrusion, to simultaneously form concentric lengths of tubing in which the tubes may be in contact or spaced from each other.

Figure 16:
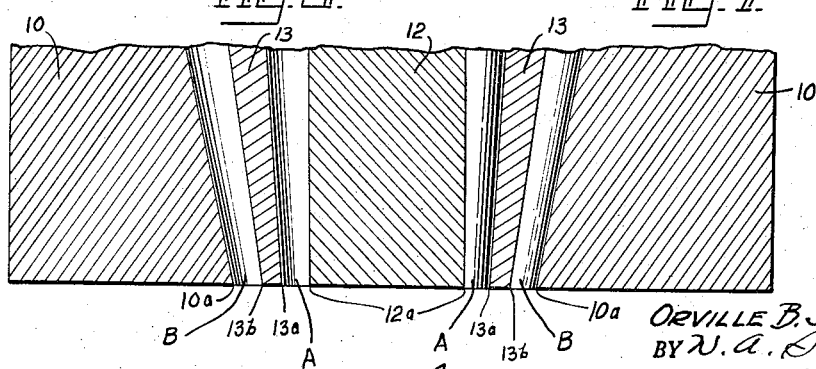

Referring to the accompanying drawings:

FIG. 1 is a sectional elevational view of an apparatus for performing the invention;

FIGS. 2 through 7 inclusive are fragmentary sectional elevational views of a portion of the apparatus shown in FIG. 1 showing the parts of the apparatus in different positions;

FIGS. 8 through 15 illustrate the steps of enclosing the various forms of laminate tubing in a mold, and blowing same to hollow form; and FIG. 16 is an enlarged scale view of the extrusion nozzles.

Normally, plastic materials undergo some degree of swelling immediately after extrusion through an orifice. The extent of this change in dimension depends on a number of factors (temperature, pressure, nature of plastic material, shape of orifice, etc.) but this change is in the direction of increasing cross-sectional area, provided no external lengthwise stretching occurs due to such effects as carry-off devices or weight of pendent material. For example, if a solid rod of plastic material is formed by extrusion through a round hole, the rod (unless stretched) will have a larger diameter than the orifice through which it was extruded. When material is being extruded through an annular orifice, there is a tendency for the wall thickness of the extruded tube to be greater than the thickness of the annular orifice.

In addition to the general effect of increasing cross-sectional area of extruded material, there are directive effects exercised by the vertical relation between the edges of the orifice through which extrusion occurs. The general effect is to bend the stream of issuing plastic around the edge which is first reached by the extruding material. In extrusion through an annular opening this effect shows itself in tendency to increase or decrease the outside diameter of the extruded tube, depending on the relation of the inside edge (mandrel) to the outside edge (orifice face). With the mandrel protruding through the orifice face the tendency is to enlarge the outside diameter of the tube; with the mandrel withdrawn into the orifice the tendency is to decrease the outside diameter of the tube.

As shown in FIG. 1, the apparatus comprises an extruder or nozzle body 10 having a vertical opening 11 therethrough. A mandrel 12 is positioned centrally of the vertical opening 11 and is mounted in a bracket 40 for adjustment longitudinally within the opening by means of threads 41 formed on its upper end and an adjusting unit 42 in contact therewith. A sleeve 13 is positioned within the vertical opening 11 surrounding and spaced from the mandrel 12, thereby forming an outer tubular cavity 14 with the walls of the vertical opening 11, and an inner tubular cavity 15 with the mandrel 12. The sleeve is longitudinally reciprocable within the vertical opening 11 by means of a pair of screws 45. A cap member 46 is mounted on and bolted to the upper end of the nozzle 10 and provides an adjusting mounting for knurled nuts 47 on each of the screws 45. The screws 45 are of the T-head type and have their T-heads mounted in slots 48 formed in the upper end of the sleeve 13. Thus by simultaneously adjusting nuts 47 the sleeve 13 may be moved up or down as may be desired. At the same time these screws 45 also prevent any rotation of sleeve 13.

The body 10 is formed with a channel 16 leading to the outer tubular cavity 14. Plastic material under pressure may be supplied from a source of plastic material such as an extruder screw 17. A second channel 18 is provided in the body 10 and is in communication with the inner tubular cavity 15 through an enlarged opening 19 in the sleeve 13. Plastic material is supplied to the channel 18 from a source of plastic such as an extruder screw 20.

The above described structure provides an apparatus whereby plastic material may be simultaneously extruded from concentric orificial openings A and B (FIG. 16) to form concentric lengths of tubular material, the inner opening A being supplied with plastic material from extruder 20 and the outer opening B being supplied with plastic material from the extruder 17. The plastic material issuing from each orifice may be of different types and may issue at different temperatures and different rates of issue if so desired.

Figure 2:
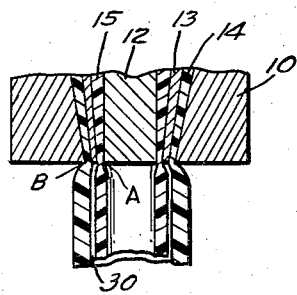

As shown in FIG. 2, the lower surface of the body 11 together with the end of the sleeve 13 and the end of the mandrel 12 form the orifices A and B which define the shape and size of the extruded plastic materials.

As is clearly shown in FIG. 16, the inner orifice A is defined between circular edge 12a of the mandrel 12 and the inner circular edge 13a of the sleeve 13. The outer orifice B is defined between the outer circular edge 13b of the sleeve 13 and the circular edge 10a of the body 10. Thus each orifice is defined between an inner circular edge and an outer circular edge.

With the lower face of the nozzle 10 and the lower faces of the sleeve and mandrel in flush relationship, both the inner and outer lengths of tubing which are being extruded, have a tendency both to increase in crosss-sectional area and bend around the edges of the orifices. There will be thus formed two concentric tubes spaced from each other and having thicknesses greater than the thickness of the orifices.

Figure 3:
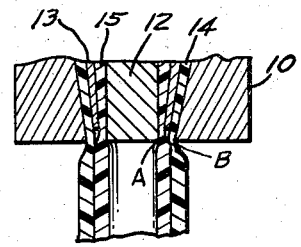

By elevating the sleeve 13 as shown in FIG. 3, the expansion of the plastic material is caused to first occur at both edges of the lower end of the sleeve 13, thereby tending to bring the lengths of tubing together. Thus the plastic material tends to bend around the first surface, namely, the end of the sleeve 13. The net result is a tendency to increase the outer diameter of the inner tubing and to decrease the inner diameter of the outer tubing resulting in physical lineal contact between the adjacent lineal surfaces of the tubes and during the simultaneous extrusion of laminated tubing.

The thickness of each length of the extruded tubing is greater than the thickness of the plastic material at the confined orifices. The thickness of the outer tubing is greater than the orifice space B between the end of the sleeve 13 and the wall of the cavity while the thickness of the inner tubing is greater than the orifice space A between the end of the sleeve 13 and the mandrel 12.

Figure 4:
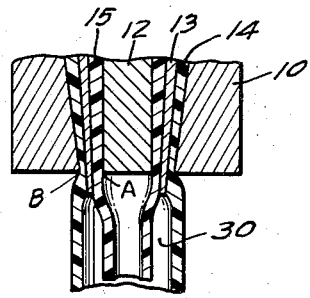

With the sleeve 13 in a lowered position beyond the lower face of the body 10 and of the mandrel 12 as shown in FIG. 4, the plastic material tends to expand as it reaches the edges of the orifice face and the end of the mandrel. In addition, the plastic material tends to bend around the edge of the orifice face and the end of the mandrel. The end result of lowering the sleeve 13 is to increase the diameter of the outer tube and decrease the diameter of the inner tube, thereby causing the lengths of tubing which are being extruded to be spaced from each other by a greater distance. The thickness of the extruded tubing is greater than the thickness of the plastic confined between the sleeve and the mandrel and nozzle at and in the confined orifices. The thickness of the outer tubing is greater than the space B between the end of the sleeve 13 and the edge of the lower face of the body while the thickness of the inner tubing is greater than the space A between the end of the sleeve 13 and the mandrel 12.

Figure 5:
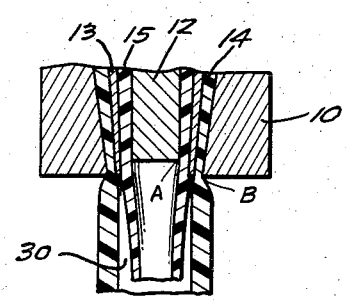

With the mandrel 12 retracted as shown in FIG. 5, and the sleeve 13 flush with the lower face of the body 10, the extrusion of the outer tubing remains undisturbed while the inner tube is caused to bend around the end of the mandrel, thereby decreasing the diameter of the inner tubing. The net result is that the two lengths of extruded tubing are caused to be spaced further apart. The thickness of the extruded tubing beyond the orificial openings is greater than the thickness of the plastic within the confined orifices. The thickness of the outer tubing is greater than the space B between the end of the sleeve 13 and the edge of the lower face of the body 10 while the thickness of the inner tubing is greater than the space A between the sleeve 13 and the end of the mandrel 12.

Figure 6:
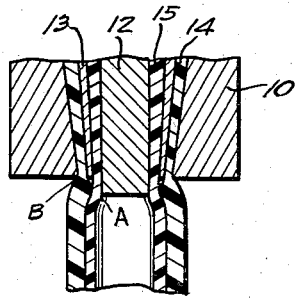

With the mandrel 12 in the lower position beyond the lower face of the body 10 and the end of the sleeve 13 as shown in FIG. 6, the outer extruded length of tubing is again undisturbed and the inner length of tubing tends to bend around the end of the sleeve, thus increasing the diameter of the extruded inner tubing. Again the thickness of the extruded tubing is greater than the thickness of the plastic within the confined orifices and the thickness of the outer extruded tubing is greater than the space B between the end of the sleeve 13 and the end of the mandrel 12 while the thickness of the inner extruded tubing is greater than the space A between the end of the sleeve 13 and the mandrel 12. There is a tendency for the inner tubing to bend around the end of the mandrel 12 but since the two lengths of tubing having contacted, the tubing does not bend around the end of the mandrel 12.

Figure 7:
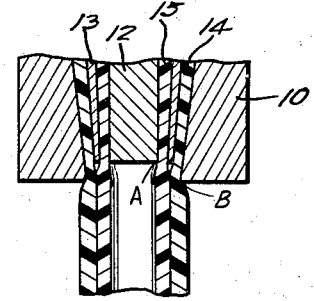

With the sleeve 13 and mandrel 12 both retracted as shown in FIG. 7, the inner length of tubing remains substantially undisturbed while the diameter of the outer tubing is decreased, bringing the lengths of tubing into contact to form laminated tubing. The thickness of the tubing is greater than the thickness of the plastic at the confined orifices. The thickness of the outer tubing is greater than the space between the end of the sleeve 13 and the wall of the cavity while the thickness of the inner tubing is greater than the space between the end of the sleeve 13 and the end of the mandrel 12.

The methods disclosed herein permit the control of the size and shape and relative positions of concentric lengths of extruded tubing by changing the relative vertical positions of the ends of the mandrel, the sleeve and the lower edge of the opening in the body or nozzle 10.

It will be noted from the aforedescribed examples that a maximum variation in radial spacing between the extruded concentric formations occurs when the inner edge of the innermost orifice A is axially shifted relative to the outer edge of orifice A and the outer edge of orifice B is shifted in the same axial direction relative to the inner edge of orifice B. When such relative axial displacement is in the direction of extrusion, as in FIG. 3, the concentric extrusions are radially deflected toward each other. When the relative axial displacement is contra the direction of extrusion, as in FIG. 4, the concentric extrusions are radially deflected away from each other. Alternatively this maximum radial shifting of the concentric extrusions may be expressed as being produced by relatively axially shifting the inner and outer edges of both orifices in opposite directions.

The extrusion of laminate tubing comprised of a multiplicity of tubular forms of plastic materials in workable condition may be accomplished for numerous purposes among which may be the production of laminate tubing per se or the production of various shapes, types of blown hollow articles from such laminate tubing and the control of the point where the lamination begins.

The control of the point where the physical contact occurs as between the plural extrusions is important because such control permits obtaining either a bonded or a non-bonded laminate. For example, if the tubes are brought together immediately upon issuance from their orifices, they will normally bond together whereas any delay tends to offset any bonding.

In numerous hollow articles the final shape thereof may be unsymmetrical or irregular and therefore may necessitate the extrusion of the laminate tubular material in such manner that various sections and/or portions of the wall thickness may be varied considerably through the length of each tubular form in order to control the thickness of the various portions of the wall in the article as ultimately shaped.

Figure 9:
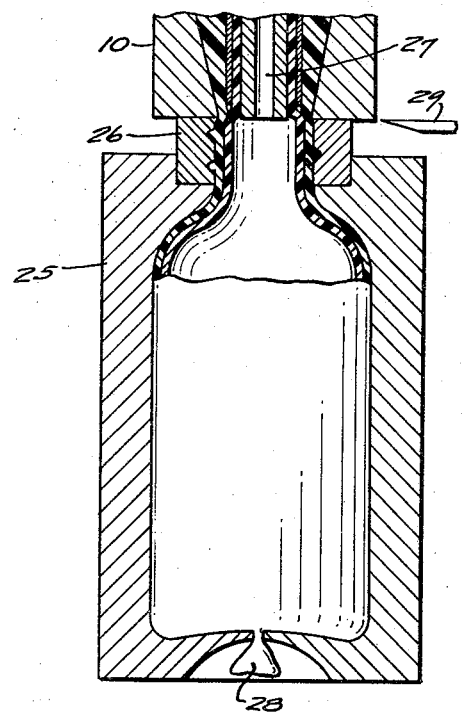
Figure 10:
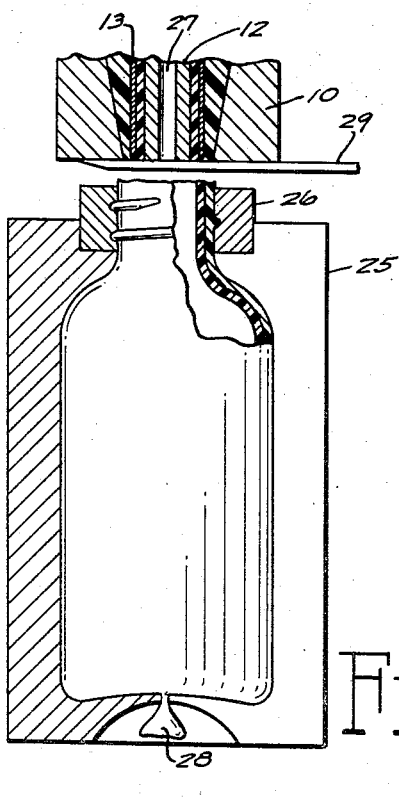

Also, in articles where the final contour is rather symmetrical, as for example, in a cylindrically shaped bottle, as shown in FIG. 10, it is necessary to expand the tubular forms to a considerable distance beyond their normal extruded diameter. By providing the walls of the tubes with an extra degree of thickness as extruded, for example, as shown in FIG. 8, the walls of the article will be of the proper thickness when the article has been expanded to a final shape such as indicated in FIGS. 9 and 10.

Figure 8:
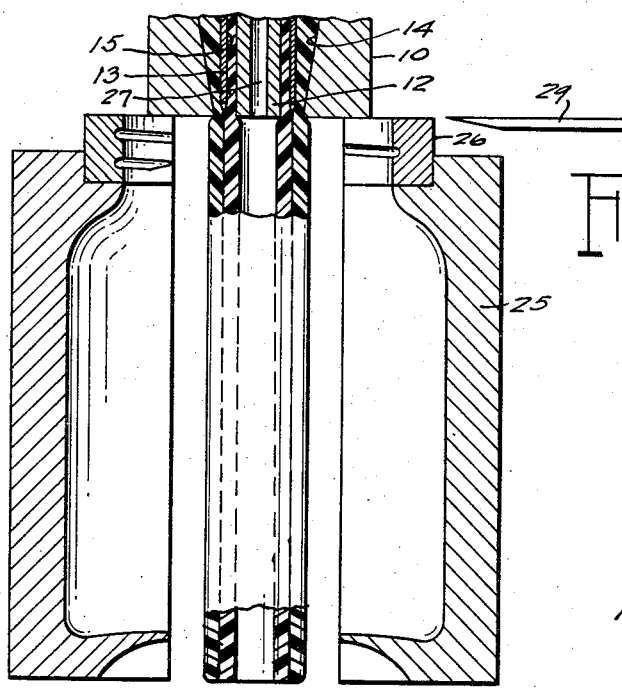

To accomplish this, the mechanical parts of the extruding mechanism will be in the position illustrated in FIG. 3, that is, the mandrel 12 will have its lower end in alignment with the bottom edge of the body 10 and the sleeve 13 will be retracted as shown in FIGS. 3–8 and 9. In FIG. 8 it will be noted that the laminate tubing has been extruded in laminate form and that the wall thickness of each tube is equal but of comparatively heavy cross-section and that the laminated tube formation is open at the bottom end.

The next step in the progress of the formation of this article is that illustrated in FIG. 9 where the body mold 25 and neck mold 26 have been closed about and in alignment with the vertical axis of the extrusion head and the closing of the mold halves has pinched and sealed the open end of the tube as indicated at 28 to permit the subsequent expansion of the tubes to final form in the molds. Air is then supplied through an opening 27 in the mandrel 12 to expand the tubing to the confines of the shaping molds.

Immediately after the expansion the molds 25 and 26 move downwardly, as in FIG. 10, and a shearing member 29 moves across the orificial openings of the extruder head 10 to sever the extrusion from the body of the material in the extruder. The shearing member 29 remains in shearing position until the molds have been moved from beneath the extrusion head 10. Thereafter the extrusion is continued and a succeeding set of molds is brought into position to cooperate with the extrusion. As a modification, the shearing may take place prior to the expansion.

Where it is desirable to have an internal coating on the article, for example, one which is resistant to or impermeable to certain liquids, any such coating need be only thick enough to prevent permeation of the contents of the article into the external wall structure of the article. In such instances the various parts of the extrusion head will be positioned and regulated in such manner that the internal tubular member will be extruded in thin cross-section as compared to the external tubular member such as illustrated in FIGS. 5 and 6.

In addition to the above there also may be occasions when it would be desirable for the body portion only of the article, illustrated in FIGS. 8–10, to be of heavier cross-section than is necessary in the neck and shoulder portions of the article and under such circumstances, the members 12 and 13 which control the type of extrusion of the moldable material, will at the inception of the extrusion, be in the position shown in FIG. 8. Then, as the tubular extrusion is reaching its approximate conclusion, the members 12 and/or 13 will have their relative positions changed, possibly to the arrangement shown in FIG. 4, to thus reduce the wall thickness of both extrusions. In this manner the body of the article will be of heavy wall section and the neck and shoulder portions only made with their wall portions of thin cross-section.

With regard to the utilization of the concentric extrusions of tubular form wherein the extrusions are spaced apart such as indicated in FIGS. 1, 4, 5 and 11–15, may it be stated that as these extrusions are made and reach a tubular length sufficient for the formation of a hollow article, as illustrated in FIG. 11, the molds 25 and 26 will be closed about the extrusion, pinching the bottom end of the same between the halves thereof, such as indicated at 28 in FIGS. 12 and 15, thus sealing both extrusions and entrapping air in the space 30 between the two extrusions. Thereafter, as air is admitted through the opening 27 and the article is expanded to final shape, the entrapped air will remain between the two extrusions, thus maintaining a spaced relationship of the outer walls of the article. However, at the approximate end of the extrusion of the spaced apart tubular forms, the control members 12 and/or 13 will through adjustment of the nuts 42 and 47 be moved to any one of the positions shown in FIGS. 3, 6 and 7, and the next portions of the laminate members, which defines the neck portion of the finished article, will be extruded in contact with each other and further forced against each other by the blowing air, thus forming a seal at the top of the article, in addition to the pinched seal at the bottom end thereof. Hence to produce successive articles, the positions of the control members 12 and/or 13 are periodically varied to alternately produce spaced and contiguous concentric extrusions.

Contrariwise, if the parts 12 and 13 are maintained in in a position similar to any one of the positions shown in FIGS. 4, 11 and 13, it will be possible to close the molds 25 and 26 and expand the tubular laminates to final shape without sealing them together at the neck portion as shown in FIG. 13. Thus, when the molds 25 and 26 are lowered and the parts 12 and 13 returned to the position shown in FIG. 14 to permit severing of the tubular extrusions, the two laminate formations will not be joined at the neck portions. In this manner a laminated container may be formed which is sealed at its bottom end and providing a hollow space 30 between the inner and outer members into which an insulating material may be injected if so desired. The two members may thereafter be sealed in any desired manner at their upper edges such as by heat sealing.

In the manner as described immediately above, a container or article may also be made wherein the inner and outer walls thereof form a hollow space portion which can entrap air or other gases to perform as an insulating barrier as between the outer surface areas and the inner confines of the article.

The term "size of tubing" as used herein is intended to include thickness and the term "shape of tubing" is intended to include any cross-sectional dimension or diameter in the case of either circular or non-circular tubing.

The term "plastic" as used herein is intended to include any plastic material which is capable of acquiring the required degree of plasticity to permit its formation into tubing by passage through an annular orifice.

The terms "annular," "tubular" and "tubing" as used herein are intended to include various hollow shapes in which plastic material may be formed including either regular or irregular shapes.

Modifications may be resorted to within the spirit and scope of the appended claims.

I claim:

1. In the art of concurrently extruding concentric tubular formations of heated thermoplastic materials through annular concentric orifices respectively defined between spaced inner and outer circular edges, the improvement of controlling during extrusion the spacing between the two tubular formations by relatively axially shifting the inner and outer edges of both orifices in opposite directions.

2. In the maufacture of laminated tubular formations of thermoplastic materials, the method of varying the spacing between the inner and outer tubular laminations comprising the steps of concurrently extruding heated thermoplastic material through annular concentric orifices, each orifice being defined by radially spaced inner and outer circular edges, and during the extruding step concurrently (1) relatively axially shifting the inner edge of one orifice with respect to the outer edge of the same orifice, and (2) axially shifting in the same direction the outer edge of the other orifice relative to the inner edge of such other orifice.

3. A process for manufacturing hollow plastic articles having laminated wall portions wherein the spacing of such lamination varies from zero to a desired maximum, comprising the steps of: initially concurrently extruding heated thermoplastic material through annular concentric orifices spaced apart sufficiently to provide the desired maximum lamination spacing, each orifice being defined by radially spaced inner and outer circular edges; continuing the concurrent extrusion while relatively axially shifting the inner edge of at least one orifice with respect to the outer edge of the same orifice in the direction to cause the tubular thermoplastic material issuing through such orifice to be radially deflected into contact with the tubular thermoplastic material issuing from the other orifice; after the desired length of zero spacing lamination is produced, enclosing the resultant concentric tubular thermoplastic formations in a mold; and expanding same to the walls of said mold by the application of fluid pressure to the interior of the innermost tubular formation.

4. A process for manufacturing hollow plastic articles having laminated wall portions wherein the spacing of such lamination varies from zero to a desired maximum, comprising the steps of: concurrently extruding heated thermoplastic material through annular concentric orifices spaced apart sufficiently to provide the desired maximum lamination spacing, each orifice being defined by radially spaced inner and outer circular edges; and during extrusion periodically axially shifting the inner edge of at least one orifice with respect to the outer edge of the same orifice in the direction to cause the tubular thermoplastic material issuing through such orifice to be radially deflected into contact with the tubular thermoplastic material issuing from the other orifice.

References Cited in the file of this patent

UNITED STATES PATENTS

| | | |
|---|---|---|
| 2,574,555 | Galloway | Nov. 13, 1951 |
| 2,632,202 | Haines | Mar. 24, 1953 |
| 2,710,987 | Sherman | June 12, 1955 |
| 2,750,625 | Colombo | June 19, 1956 |
| 2,781,551 | Richerod | Feb. 19, 1957 |

FOREIGN PATENTS

| | | |
|---|---|---|
| 1,025,834 | France | Jan. 28, 1953 |